United States Patent [19]

Erickson

[11] 4,262,226

[45] Apr. 14, 1981

[54] INSULATING FLUID SYSTEM FOR PROTECTING SUBMERSIBLE ELECTRIC MOTORS FROM SURROUNDING FLUIDS

[75] Inventor: John W. Erickson, Huntington Beach, Calif.

[73] Assignee: Kobe, Inc., City of Commerce, Calif.

[21] Appl. No.: 68,787

[22] Filed: Aug. 22, 1979

[51] Int. Cl.³ .............................................. H02K 5/10
[52] U.S. Cl. ...................................................... 310/87
[58] Field of Search .................... 310/87, 64; 417/321, 417/366–368, 410, 414, 422

[56] References Cited

U.S. PATENT DOCUMENTS

| | | | |
|---|---|---|---|
| 1,610,726 | 12/1926 | Arutunoff | 310/87 X |
| 2,080,678 | 5/1937 | Van Horn | 310/87 X |
| 2,291,248 | 7/1942 | Myers | 310/87 X |
| 2,305,648 | 12/1942 | Van Horn | 310/87 |
| 2,325,930 | 8/1943 | Auigdor | 310/87 |
| 2,404,783 | 7/1946 | Blom | 310/87 X |
| 2,492,141 | 12/1949 | Gaylord | 310/87 |
| 2,740,059 | 3/1956 | Conery | 310/87 |
| 2,862,122 | 11/1958 | Courtin et al. | 310/87 |
| 2,938,131 | 5/1960 | Maynard | 310/87 |
| 3,688,140 | 8/1972 | Schaefer | 310/87 |

*Primary Examiner*—Mark O. Budd
*Attorney, Agent, or Firm*—William C. Norvell, Jr.

[57] ABSTRACT

A method and apparatus are provided for protecting a submersible electric motor from failure due to contamination of the windings of such motor by the fluids surrounding the motor in its submerged environment. A conduit is provided extending from a pressurized source of insulating fluid to the housing of the electric motor immersed in fluids to be pumped. Valve means are provided between the lower end of the tubing and the interior of the motor housing to permit the entry of pressurized lubricating fluid into the motor housing to maintain the internal pressure in the motor housing at a level on the order of 100 p.s.i., or a determinable rate above the pressure of the surrounding fluids. In accordance with a modification of this invention, the electrical cable by which the submerged motor is energized, is disposed within the conduit filled with insulating fluid.

1 Claim, 3 Drawing Figures

INSULATING FLUID SYSTEM FOR PROTECTING SUBMERSIBLE ELECTRIC MOTORS FROM SURROUNDING FLUIDS

BACKGROUND OF THE INVENTION

1. Field of the Invention

This invention relates to a system for protecting a submersible motor from inadvertent leakage into the motor housing of surrounding fluids, which could result in the electrical failure of the motor.

2. Description of the Prior Art

Submersible motors have long been employed in a number of industrial fields and are particularly useful when disposed at the bottom of an oil well for the purpose of driving a pump to lift the production fluid out of the well. In many environments, and particularly at the bottom of a fairly deep well, it is well known that the ambient pressure of the fluids surrounding the submersible electric motor is on the order of several thousand p.s.i. With pressures of this sort of magnitude, leakage of the well fluids into the motor chamber has been common. Such leakage can occur either through the seals surrounding the rotating power shaft, which necessarily must extend out of the motor housing, through the seals provided around the electrical conduit at the point that it enters the motor housing, or at casing joints. The efforts of the prior art have been in the direction of attempts to improve such seals, and have necessarily resulted in expensive configurations which still do not provide the desired degree of reliability under high differential pressure conditions.

A commercially available scheme has been developed to equalize the pressure between the motor housing and the surrounding well fluids by use of bellows or inter-connected auxiliary chambers.

Additionally, U.S. Pat. No. 2,002,912 to Mendenhall, et al, approached the problem by equalizing the pressure of the insulating fluid in the motor housing with that of the surrounding well fluids, but employed a complicated electrical sensing arrangement responsive to the well fluid level in a balance chamber to control the addition of insulating fluid to the motor housing.

There is, therefore, a need for an improved simplified system for protecting the interior of a submerged electric motor housing from the deleterious effects of surrounding fluids leaking into such housing through the various necessary seals provided on such housing.

SUMMARY OF THE INVENTION

This invention provides a method and apparatus for protecting the windings and bearing elements of a submerged electric motor from the deleterious effects of fluids surrounding the submerged motor by providing a fluid connection between the interior of the submersible motor housing and a source of pressurized insulating or di-electric fluid. An appropriate valve is provided in a flow path of the insulating fluid to permit the flow of such fluid into the motor housing to maintain the pressure of the insulating fluid in the interior of the motor housing at a determinable rate, generally at a level on the order of 100 p.s.i. above the surrounding fluids. In other words, the insulating fluid within the motor housing is always maintained at a pressure level substantially in excess of the pressure of the external fluids, thereby effectively preventing any flow of the external fluids into the motor housing through the various sealing elements provided thereon.

In the event that water should enter the motor, it is accumulated in a sump and drained out of the motor housing.

In accordance with a preferred modification of this invention, the conduit supplying the insulating fluid to the housing of a submerged electric motor is also utilized to provide a protective shield for the electrical cable required to energize the submerged motor. If the conduit is defined by a length of coiled tubing, in the case of a submerged oil well motor, the installation of the motor in the bottom of the well without damage to the electrical cable may be conveniently accomplished.

Further objects and advantages of this invention will be apparent to those skilled in the art from the following detailed description.

DESCRIPTION OF THE PREFERRED EMBODIMENTS

Figure 1:
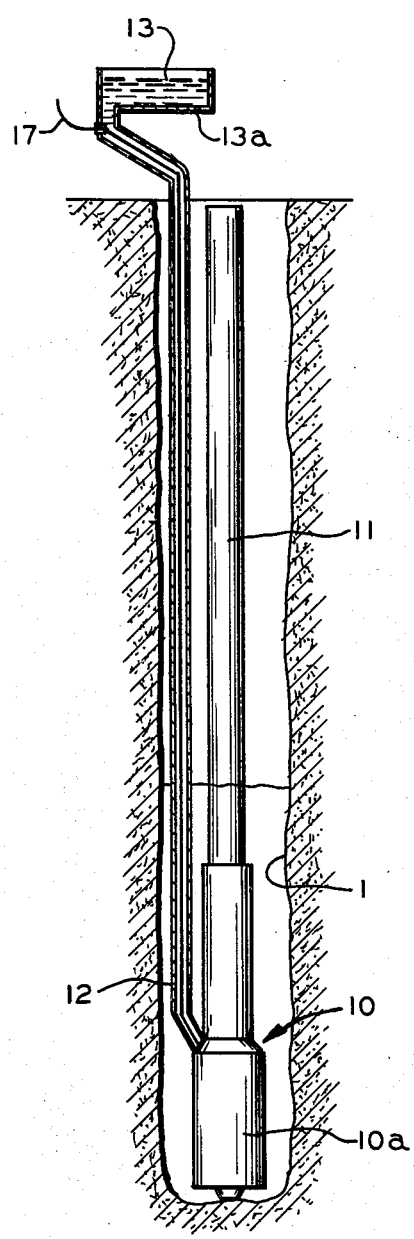
FIG. 1 is a schematic vertical sectional view of an oil well having an electrically driven submersible pump mounted therein, and provided with the protective apparatus embodying this invention.

Referring to FIG. 1, the numeral 1 schematically indicates an oil well bore extending from the well head to the production zone of the well. A submersible electric motor driven pumping unit 10 is conventionally mounted in the lower portions of the well bore and the fluid output of the pumping unit 10 is transmitted to the well head by an interconnected production casing 11.

In accordance with this invention, a continuous hollow conduit 12 is provided extending from the motor housing portion 10a of the pumping unit 10 to the well head. Such conduit may be conveniently defined by a continuous length of selectively coiled tubing. At the well head, conduit 12 communicates with a source of pressurized di-electric fluid 13. In the specific embodiment illustrated, the pressure head imparted to the di-electric fluid is obtained by the elevation of a fluid reservoir 13a above the elevation of the well head. Alternatively, a pump (not shown) could be employed to produce the desired amount of pressure, as hereinafter specified.

Figure 2:
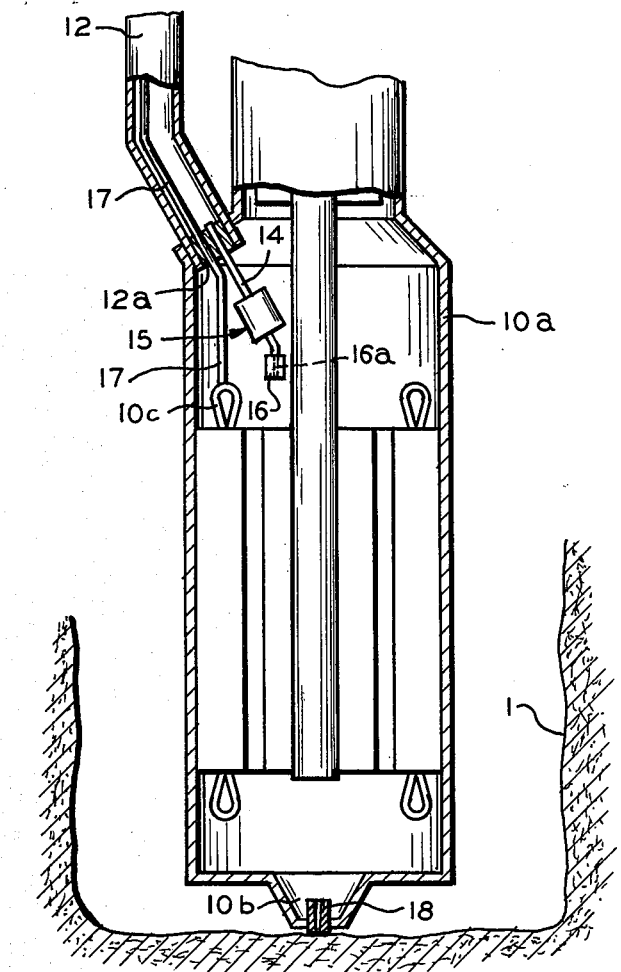
FIG. 2 is an enlarged scale vertical sectional view of the submersible motor employed in the apparatus of FIG. 1.

Referring to FIG. 2, the bottom end of conduit 12 is interconnected with the interior of the electric motor housing 10a by an appropriate sealed connection 12a. The di-electric fluid 13 contained in conduit 12 is not, however, permitted to flow freely into the interior of pumping unit 10 but instead passes into the motor housing 10a through a supply tube 14 which passes through the seal 12a in the end of conduit 12, and then through a filter 15 to an appropriate valving mechanism, schematically represented at 16. In the modification of FIG. 2, such valving mechanism may comprise a capillary tube 16a which, together with the capillary tube 18, is dimensioned to produce a determinable fluid flow and pressure differential into the interior of the electric motor housing 10a. Alternatively, a control valve 16 and a control valve 18 may be substituted without the incorporation of a capillary, for use when the pressure differential in such motor housing drops to a level below the determinable level, typically about 100 p.s.i. in excess of the pressure of the surrounding well fluids. This means, therefore, that the pressure applied to the di-electric fluid 13 at the well head must be sufficient to insure that a determinable minimum pressure differential, typically on the order of about 100 p.s.i. above the ambient pressure of the well fluids surrounding the submerged pumping unit 10, will be maintained.

It should be noted that in order to avoid excessive pressure over the determinable pressure within the motor housing 10a, the valve 18 is provided to drain off some fluid and reduce the excessive pressure to the determinable level.

As is well known, use of capillaries will preferably necessitate incorporation of filters therein to control debris flow and to prevent plugging of the capillary.

As is well known in the art, the di-electric fluid 13 constitutes an oil having excellent insulating properties which has been especially treated to remove all water therefrom. The motor housing 10a is filled with such oil and, as long as water is not permitted to accumulate in the housing 10a through gradual seepage through a shaft seal or an electrical connection seal, the possibility of the motor experiencing a failure due to arcing across the windings 10c is minimized. With the pressure differential at a determinable rate, typically of at least about 100 p.s.i. over that of the surrounding well fluids being maintained within the motor housing 10a, it follows that whatever seepage or leakage occurs through the seals will be in an outward direction from the motor housing. So long as the di-electric fluid seeping outwardly is replaced within the motor housing, by the functioning of the valve 16, then the possibility of water entering such housing is minimized.

Even with this protective arrangement, it occasionally happens that some water finds its way within the motor housing. Water, being heavier than the di-electric fluid which fills the motor housing, will settle to the bottom of motor housing 10a. In accordance with this invention, a sump 10b is provided in the lowermost portions of motor housing 10a to permit the water to accumulate therein. The capillary tube 18 is provided communicating between the sump and the surrounding well fluids.

If desired, the conduit 12 for the pressurized di-electric fluid can be conveniently employed as a protective sheath for the electrical cable 17 which supplies power to the windings 10c of the submerged electric motor unit 10. Since the cable 17 is disposed within a metallic sheath provided by the coiled tubing conduit 12, and is completely surrounded by insulating fluid, the amount of protective insulation provided on such cable may be substantially reduced, thus, significantly decreasing the cost of such electric cable. Cable 17 extends through the same seal 12a as provided for the supply tube 14.

Figure 3:
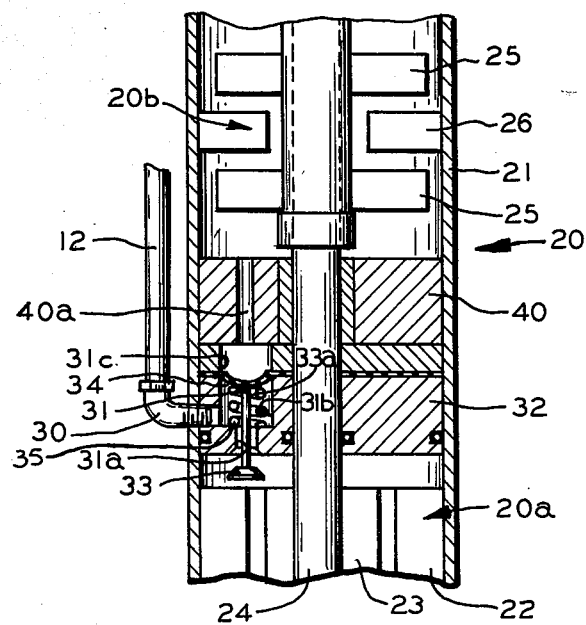
FIG. 3 is an enlarged scale vertical sectional view of portions of a submersible motor and pump incorporating a modification of this invention.

A further embodiment of this invention is illustrated in FIG. 3. Here, a pumping unit 20 is illustrated as comprising a single housing 21 containing at its lower end windings 22 and a rotor 23 of an electric motor 20a which drives an upwardly extending shaft 24. Rotor elements 25 of a fluid pump 20b are secured to the shaft 24 and cooperate with stator elements 26 which are secured to the housing 21.

Conventional fluid connections (not shown) are provided to direct the well fluids into the bottom inlet end of the pump 20b.

The fluid conduit 12 providing a pressurized supply of di-electric fluid is sealingly connected into that portion of the housing 21 that lies intermediate the motor elements and the pump elements. Thus, conduit 12 is sealingly connected to a nipple 30 which provides a sealed fluid passage into a valve chamber 31 defined in an annular valve block 32 which is sealingly mounted between the housing 21 and the motor shaft 24. The lower end of valve chamber 31 communicates with the interior of the motor unit through an axial port 31a. Fluid flow through such port is controlled by a check valve 33 having an axially extending stem 33a connected to a flexible diaphragm 34 which divides the interior of valve chamber 31 into a lower and upper compartment. The lower compartment 31b is obviously exposed to the pressurized di-electric fluid. Upper compartment 31c is exposed to the pressure of the well fluids through an axially extending port 40a provided in a bearing block 40 which separates the valve block 32 from the components of the pump. A spring 35 normally urges the diaphragm 34 upwardly to close the valve 33. The bias of spring 35 is proportioned so as to permit a downward flexing of the diaphragm 34 whenever the pressure differential between the di-electric fluid in valve chamber 31a and the well fluids in the chamber 31c falls below a determinable rate, typically a value on the order of about 100 p.s.i., thus permitting check valve 33 to open, and additional pressurized di-electric fluid to flow into the motor housing.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. In a submersible electric motor for installation in an oil well, said motor having a housing, a vertical output shaft projecting out of the top end of the said housing, and sealing means between said shaft and said housing, the improvement comprising: a length of coiled tubing extending from well head to said housing; means for sealingly connecting the lower end of said coiled tubing to the upper portions of said motor housing; means for filling said tubing with pressurized insulating fluid; means at the bottom end of said coiled tubing for supplying insulating fluid to the interior of said housing at a pressure differential at least about 100 p.s.i. above that of the well fluid surrounding the housing; electrical power lines mounted within said tubing for energizing said motor; a sump in the bottom portion of said motor housing; and a capillary drain from said sump proportioned to automatically remove water from said sump at a pressure differential at least about 100 p.s.i.

* * * * *